Dec. 27, 1938.  G. CONSTANTINESCO  2,141,517
GEAR RATIO INDICATOR AND/OR CONTROL DEVICE
Filed April 15, 1936  2 Sheets-Sheet 1
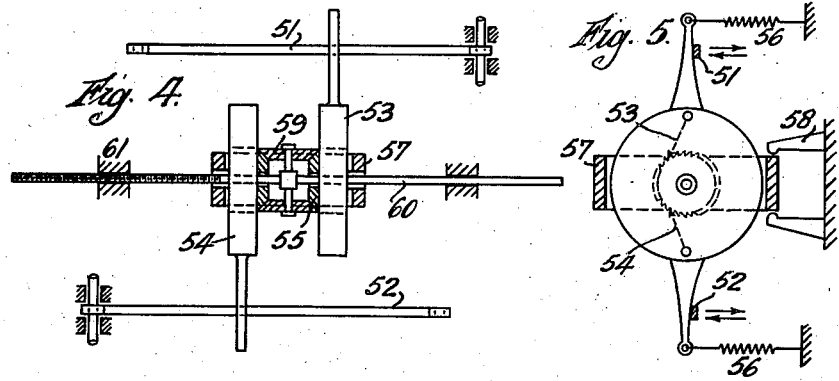
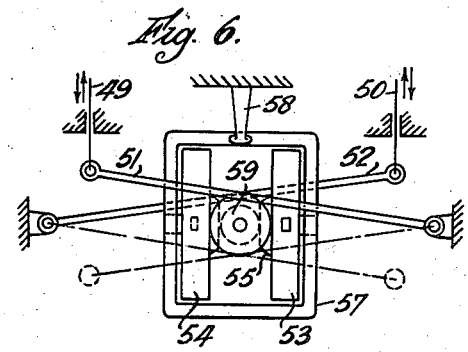
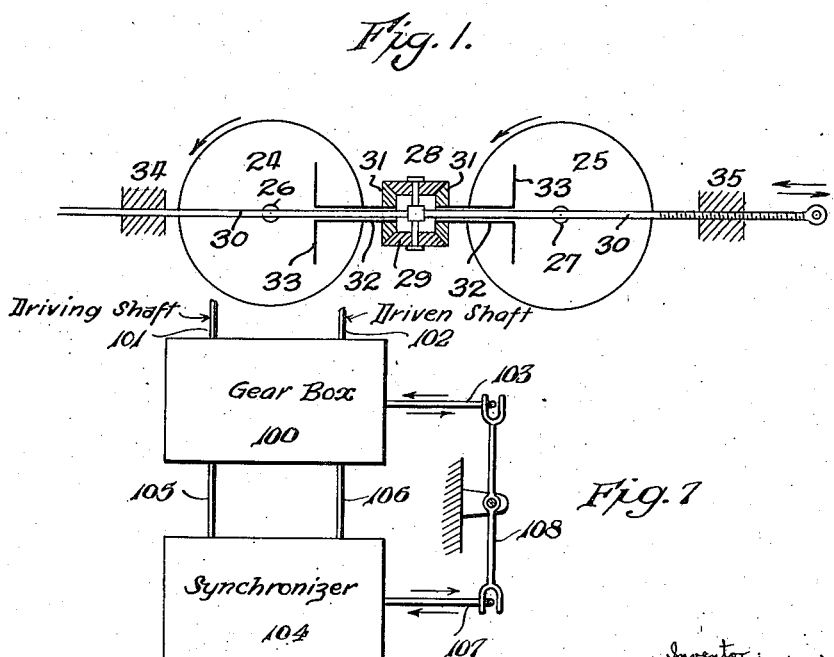

Dec. 27, 1938.   G. CONSTANTINESCO   2,141,517
GEAR RATIO INDICATOR AND/OR CONTROL DEVICE
Filed April 15, 1936   2 Sheets-Sheet 2

Inventor:
George Constantinesco,
By his attorneys,

Patented Dec. 27, 1938

2,141,517

UNITED STATES PATENT OFFICE 2,141,517

GEAR RATIO INDICATOR AND/OR CONTROL DEVICE

George Constantinesco, Oxen House, Torver, Coniston, England

Application April 15, 1936, Serial No. 74,562
In Great Britain April 30, 1935

4 Claims. (Cl. 74—395)

This invention relates to gear ratio indicators and/or control devices and has for its object to provide an apparatus for indicating and controlling the gear ratio between two rotating shafts the drive between which may be engaged or disengaged at will if desired automatically.

The invention is particularly applicable to gear boxes of any kind where various gear ratios may be engaged between a driving member and a driven member.

The invention is also applicable to cases where the transmission between two shafts is a friction drive and when it is required to know the amount of slip occurring or to control or prevent such slip.

According to the present invention a gear ratio indicator and/or control device comprises a driving and a driven member, hereinafter referred to respectively as a primary and a secondary member and a third member (hereinafter referred to as the synchronizer, such expression being intended to include an indicator or control member) which comprises a floating differential device, the synchronizer being driven by the primary and secondary members about an axis other than those of the primary and secondary members, and on change of relative speed between said primary and secondary members is operated thereby either to indicate the gear ratio between the primary and secondary or driving elements thereof or to control the change of ratio or synchronism between the said primary and secondary members.

An apparatus for indicating the speed ratio between two shafts is known in which the driving and driven shafts have their axes arranged in planes perpendicular to one another carrying a disc and the driven shaft a wheel constantly tangential to the surface of the disc and slidable on the driven shaft, the disc and wheel being driven about an axis parallel respectively with the driving and driven shafts.

Various forms of the invention are diagrammatically illustrated in the accompanying drawings wherein:

Figure 1 shows one form of the synchronizer;

Figure 2:
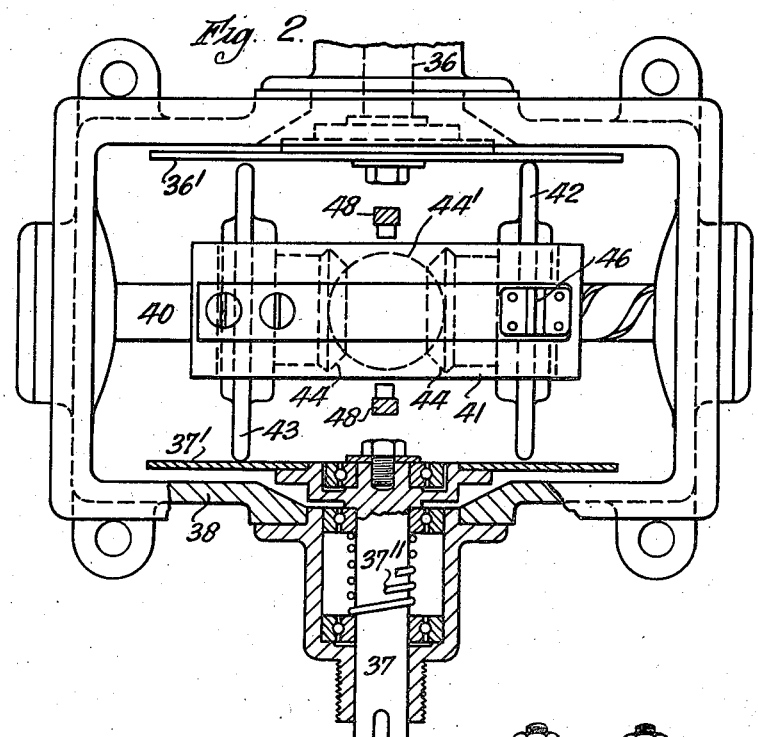
Figures 2 and 3 show one way of carrying the invention into effect.

Figures 4, 5, and 6 show a modification of the synchronizer, the drive to which is intermittent.

Figure 7 illustrates diagrammatically the interconnection of a synchronizer with a variable speed ratio gear device.

In the form of the invention illustrated in Figure 1, the primary and secondary members, which may more conveniently be termed rotors and driven by say the driving and driven shafts of a gear box respectively either at the same speed or at a predetermined fixed proportion of such speed, comprise two flat discs 24, 25 rotating in the same plane around two fixed axes 26, 27, the disc 24 being connected, for example, to the engine and the disc 25 to the Cardan shaft and hence the road wheels. The synchronizer comprises a system 28 formed of a differential whose floating gears 29 are carried by a mount 29ª which is fixed on and can rotate with a solid shaft 30 perpendicular to and in the same plane with the rotor shafts. The other two members 31 of the differential are rotated through hollow shafts 32 by two equal friction discs 33 each in contact at right angles with one rotor disc, 24, 25.

The solid shaft 30 of the synchronizer is guided at one end in a bearing 34 which allows it free axial movement, the other end of the shaft being threaded and screwed into a fixed nut 35.

The disc 24 and its associated contacting disc 33 constitute variable ratio drive connections for actuating the left-hand gear 31 (as viewed in Figure 1) by rotation of the shaft 26; similarly, the disc 25 and its associated contacting disc 33 constitute variable ratio drive connections for actuating the right-hand gear 31.

It will be seen that if the rotor discs 24, 25 rotate in the same direction the third member 29 of the differential will be stationary only when the friction discs 33 have exactly the same speed. In such conditions the synchronizer system remains stationary along its shaft. But as soon as the relative angular velocities of the rotors 24, 25 is altered, for example when the gears are in neutral, the synchronizer will have its shaft 30 rotated by the intermediary member 29 of the differential with the result that the synchronizer shaft 30 will be screwed into or out of the fixed nut 35 and thus the whole synchronizer system will move along its axis and thus alter automatically the diameters of the pitch circles of contact of the friction discs 33 with the rotor discs 24, 25. If the screw 35 continues to turn in the same direction this action will continue until the synchronizer takes such a position that its friction discs rotate again at the same speed thus rendering the synchronizer again stationary. Instead of the fixed nut 35 and mobile screw 30, the screw may be fixed and the nut mobile as shown with reference to Figures 2 and 3 to be described below.

It will thus be seen that, when the discs 24, 25 are coupled respectively to the engine and Cardan shaft and when the gears are in neutral, relative movement between the discs 24, 25 occurs so as to operate the synchronizer, which will move to take up a position equivalent to the particular gear ratio to be engaged and which will then remain in this position when the said gear is engaged.

The new position of the synchronizer will thus be an indication of the new gear ratio between the rotors. The synchronizer shaft can, e. g., be adapted to contact with an electric contact so that axial movement of the said shaft will make or break an electric circuit to give an indication of the gear ratio between the rotors or the said shaft can be caused on axial movement of the shaft and through mechanism, to be described in detail below, to control the gear ratio between the rotors.

Instead of the rotors being in one plane I may arrange them in two parallel planes coaxially and place the synchronizer system between them with its shaft slightly tilted so that each rotor drives only one of the friction discs. In this form of the invention only one synchronizer and a pair of rotors are necessary to indicate any number of gear ratios. For instance if the rotors are rotated respectively from the engine and the Cardan shaft of a motor vehicle, the synchronizer will assume automatically as many fixed positions as there are gear changes in the gear box, by providing suitable electric, pneumatic or hydraulic relay devices, the synchronizer can actually control or even effect the gear changes in the gear box from the neutral position of the gears without any necessity for declutching, said operations being more particularly described in British Patent 457,850. This is a consequence of the fact that there corresponds a certain position of the synchronizer for each pair of gears in the gear box to be engaged when these are rotating at the same speed. If then in such position the synchronizer closes for example an electric circuit, the current can operate the gear change directly or through suitable relays and servomotors.

Figure 3:
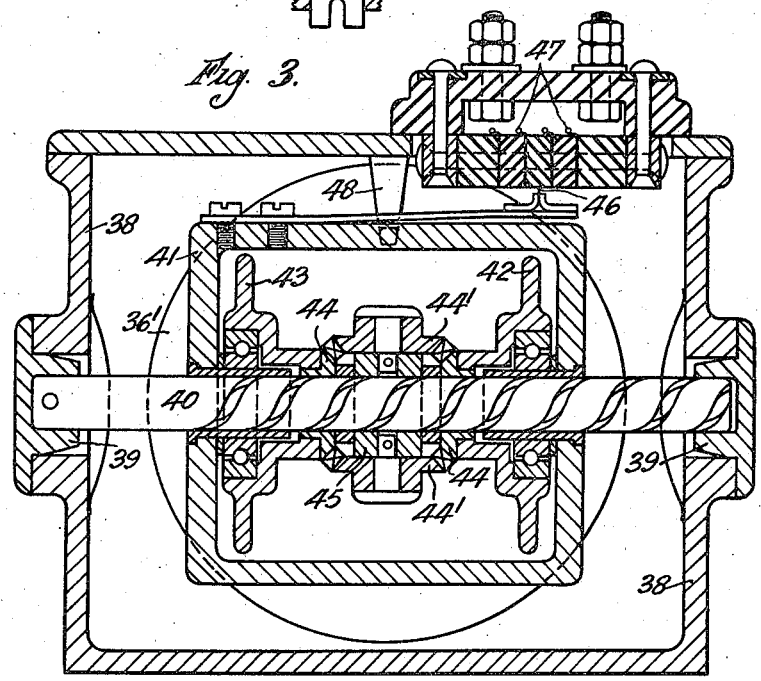

This arrangement is specifically illustrated in Figures 2 and 3 and in these figures the primary 36 and secondary shafts 37 enter a convenient casing 38 from opposite sides, each shaft carrying at its end a plate 36', 37' respectively. The synchronizer is mounted in suitable bearings 39 in the casing 38 with its axis slightly tilted at right angles to the axes of the primary and secondary shafts, and consists of a screwed rod 40 on which is slidably mounted a cage 41 and also two discs 42, 43. one 42 of which is arranged to contact with the primary rotor plate 36' and the other 43 with the secondary rotor plate 37', which plates are normally pressed into abutment with said discs by springs 37''. The two discs 42, 43 are fast with two members 44 of a differential whose intermediary members 44' are carried by a nut 45 mounted on the screwed rod 40. The cage 41 has secured thereto, for example, by screws, a spring contact 46 which is adapted to make contact with one of a plurality of contacts 47 to complete a circuit which may, for example, illuminate an electric lamp (not shown). The casing 38 carries locating stops 48 to prevent the cage 41 from turning.

The operation of the device is as follows: Assuming the primary and secondary plates 36', 37' to be rotating at the same speed, then the synchronizer discs 42, 43 will likewise rotate at the same speed. When synchronism however is broken the synchronizer discs rotating at different speeds will cause the intermediary member 44' of the differential to turn so that the nut 45 will screw along the screwed rod 40, hence moving the cage 41 which carries the contact 46 so as to make or break circuit with one or other of the contacts 47, which as stated above may be in circuit with a lamp which on illumination will give a warning to the effect that it is necessary to change gear.

The spring contact 46 and the contacts 47 are so arranged that normally the contact 46 is in the middle of the corresponding contact 47 when the predetermined gear ratio obtains, so that actually in operation electrical contact is made and an indication given a certain time before the actual gear ratio is reached, the length of time depending on the width of the contact segments 47.

In a still further form of the invention the primary and secondary rotors are intermittently driven by providing the rotors with one way clutches which will drive them in one direction only, when oscillatory motion is imparted to the said one way clutches or freewheels. Preferably the stroke of the oscillations is so arranged as to remain constant, either by providing limiting stops, or by driving them through rigid connections. In such cases the two shafts of any machine of which the relative angular speed is to be controlled will be provided with eccentrics, cams, notches or the like for producing oscillatory motion. This will be carried by links, wires or chains to the controlling instrument where the oscillatory motion will act on the oscillating members which drive the rotors. Alternatively this may be effected by means of electro-magnets energized intermittently by suitable interruptors mounted on the respective rotating shafts. For all the types in which the instrument is arranged for one or more constant gear ratios the oscillations of constant amplitude will be transmitted direct to the freewheel oscillators.

One particular form of carrying such an arrangement into effect is shown in Figures 4, 5 and 6 wherein the drive from cranks on the primary and secondary shafts reciprocate links 49, 50 connected to two links 51, 52 each of which is adapted to operate a one-way clutch 53, 54 each of which clutches is connected to one side of a differential 55 which constitutes the synchronizer. The arms of the one-way clutches which are driven by the links, are biased to their normal position by springs 56. A cage 57 is provided which encloses the one-way clutches 53, 54 and differential and is prevented from turning by stops 58 in the same manner as described with reference to the arrangement shown in Figures 2 and 3. The intermediary member 59 of the differential is fast with a rod 60 one end of which is screwed and engages in a nut 61 so that on synchronism being broken the intermediary member of the differential is caused to rotate and hence impart relative movement between the rod and nut, which as in the previous arrangement may be adapted to illuminate a warning device, or may operate a gear change directly or through suitable relays as described in British Patent 457,850.

For all types in which the instrument indicates with only two rotors a variable number of speeds, the oscillations of constant amplitude will be transmitted to the intermediary members which drive the rotors, for example to the friction discs as hereinbefore described which impart variable angular rotation to the rotors.

The instrument in the form shown in Figures 4, 5, and 6 being positively driven (i. e., without the intervention of friction surfaces) is capable of transmitting considerable force to the synchronizer which can therefore, if desired, control directly, without relays, for example steam, pneumatic or hydraulic valves, electric rheostats, throttles of engines and the like control apparatus.

Figure 7 illustrates diagrammatically one way of connecting a synchronizer embodying the invention to a variable speed ratio gear device which may be of conventional form. The arrangement shown includes a gear box, indicated at 100, a driving shaft 101, and a driven shaft 102. A longitudinally movable control element 103 is adapted to change the ratio of the gears in the gear box 100. The synchronizer is shown at 104, the speed of the driving shaft being transmitted to the synchronizer through a suitable connecting element 105, whereas the speed of the driven shaft 102 is transmitted to the synchronizer through a suitable connecting element 106. The movable synchronizer element, for example the shaft 30, shown in Figure 1, or the cage 41 shown in Figures 2 and 3, or the rod 60, shown in Figure 4, is indicated diagrammatically at 107 and is operatively connected to the gear box control element 103 by means of a lever 108.

I claim:

1. The combination with a primary driving member and a secondary driven member, of a differential gearing assembly including two gears rotatable respectively about a fixed axis, a floating gear meshing with said fixed axis gears, and a rotatable mount for said floating gear; variable drive actuating connections between the two fixed axis gears and the primary and secondary members respectively; a screw element; and a nut element having threaded engagement with said screw element, one of said elements being fixed and the other of said elements being connected to said mount and being thereby bodily movable with said differential gearing assembly and said actuating connections upon variation of the speed ratio of the driving and driven members and consequent differential turning of said fixed axis gears, the said movable element being adapted to indicate by its position the gear ratio between the primary and secondary members.

2. The combination with a primary driving member and a secondary driven member, of a differential gearing assembly including two gears rotatable respectively about a fixed axis, a floating gear meshing with said fixed axis gears, and a rotatable mount for said floating gear; variable drive actuating connections between the two fixed axis gears and the primary and secondary members respectively; a screw element; and a nut element having threaded engagement with said screw element, one of said elements being fixed and the other of said elements being connected to said mount and being thereby bodily movable with said differential gearing assembly and said actuating connections upon variation of the speed ratio of the driving and driven members and consequent differential turning of said fixed axis gears, said movable element being provided with means for connection to other means for changing the gear ratio between said primary and secondary members.

3. Apparatus as defined in claim 1 and in which the nut is fixed and the screw is connected to and bodily movable with the floating gear mount.

4. Apparatus as defined in claim 1 and in which said primary and secondary members comprise rotatable shafts, the connections between said fixed axis gears and said shafts including discs mounted respectively on said shafts to rotate therewith, and rollers connected respectively to the fixed axis gears and respectively in contact with said discs.

GEORGE CONSTANTINESCO.